Aug. 11, 1970   W. G. HAWKINS   3,523,993
MOULDING OF ELASTOPLASTIC AND ELASTOMERIC SUBSTANCES
Original Filed Oct. 28, 1964   4 Sheets-Sheet 4
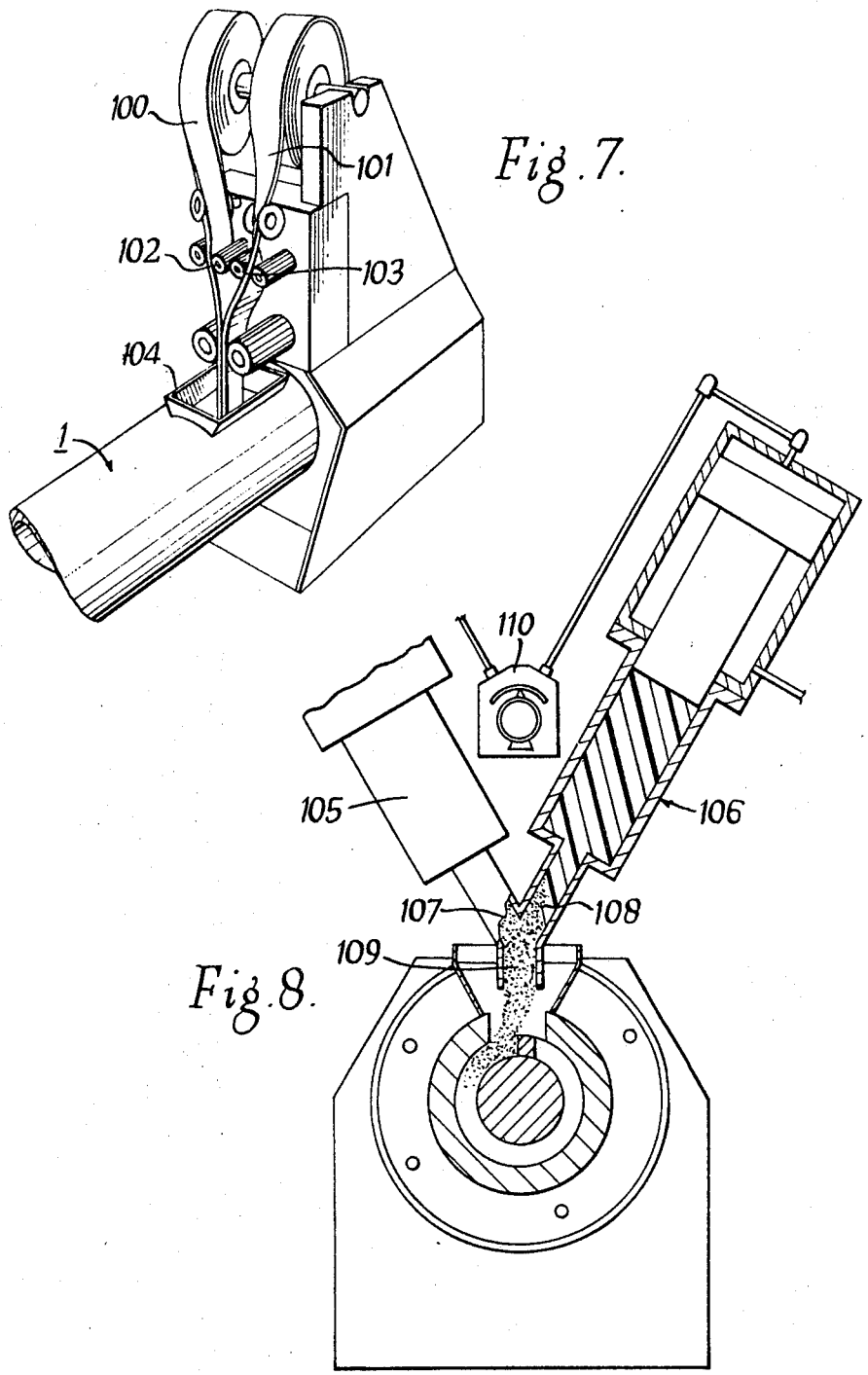
INVENTOR
Wallace Gerald Hawkins
BY Wenderoth,
Lind & Ponack ATTORNEYS

United States Patent Office 3,523,993
Patented Aug. 11, 1970

3,523,993
MOULDING OF ELASTOPLASTIC AND ELASTOMERIC SUBSTANCES
Wallace Gerald Hawkins, Ashcott, near Bridgwater, Somerset, England, assignor to C.I.C. Engineering Limited, Bath, Somerset, England, a British company
Continuation of application Ser. No. 407,076, Oct. 28, 1964. This application July 3, 1968, Ser. No. 745,079
Claims priority, application Great Britain, Oct. 28, 1963, 42,345/63
Int. Cl. B29h 7/08
U.S. Cl. 264—244                                  4 Claims

ABSTRACT OF THE DISCLOSURE

The present invention provides for a method of moulding articles comprising discharging a moulding material from feeding means into a moulding cavity of a mould as said feeding means is withdrawn axially from said cavity in such manner that the volume of substance discharged varies according to the cross section of the article to be moulded at the point of discharge, and displacing at least one component of the mould to apply a moulding pressure to the mould contents.

---

This application is a continuation of Ser. No. 407,076 filed Oct. 28, 1964, now abandoned.

This invention relates to the moulding of articles of elastomeric and elastoplastic substances, such as rubber and vinyl copolymers, and has for its main object the provision of an improved method for moulding such articles.

The invention is directed particularly to the moulding of articles having complex configurations and/or regions of relatively small cross-sectional area from stiff or viscous substances. Certain rubber compounds such as, for example, those used for the manufacture of boot and shoe soles and heels or of all-rubber footwear, remain relatively stiff during moulding and are conventionally moulded by compression moulding techniques. Satisfactory commercial use of such substances requires extensive pretreatment of the substances prior to the moulding operation, such as the cutting of unvulcanised material into blanks approximating the shape of the desire end product, the preparation by weight of the required amount of material and some form of preheating to afford a minimum moulding and curing period. Such materials do not lend themselves readily to injection moulding processes insofar as the high viscosity of the material requires high pressures to be generated during injection to ensure adequate mould filling and calls for undesirably high mould closing and locking forces to contain such internal pressures, particularly where the mould cavity employed includes areas of small cross section or inserts for incorporation in the moulded article. Either or both of these mould features offer restrictions to the flow of materials during mould filling.

A particular example exists in the moulding of a combined shoe sole and heel in situ against the bottom of a prepared lasted shoe upper, which latter forms part of the mould cavity. In this case the presence of a heel filler block affixed to the shoe upper and the fact that the cross-sectional area of the mould cavity varies from a maximum at the heel breast portion to a minimum in the waist area, with an increase again in the sole area proper, together offer restrictions to the flow of any material injected into the mould. Obviously, a highly viscous material (such as a part plasticised rubber mix) will demand high pressures for injections into such a mould cavity. Such pressures are, generally, in excess of the mould closing pressures permissible against leather or like upper materials.

The present invention, according to one aspect, affords a method of moulding articles of elastomeric or elastoplastic substances which includes the steps of plasticising the substance to be moulded, discharging the plasticised substance from feeding means into a moulding cavity of a mould as said feeding means is withdrawn axially from said cavity in such manner that the volume of substance discharged varies according to the cross section of the article to be moulded at the point of discharge.

More particularly the improved method of moulding such articles as above referred to, involves the distribution of the plasticised substance throughout the moulding cavity of a mould assembly in such a manner that it is deposited in each part of said moulding cavity in a volume conforming substantially with the volume, in each part, of the article when moulded and displacing at least one component of the mould assembly to apply a moulding pressure to the mould contents.

The distribution of the plasticised substance within the moulding cavity could in some cases only approximate to the changing cross-sectional size of the article being moulded, as the moving pressure-applying mould component could cause flow or displacement to produce the required finished form of the moulded article. Generally, it will be convenient to provide for right-line relative movement between a discharge nozzle and the mould assembly, and although the mould assembly could be displaced longitudinally relatively to a fixed nozzle, it will usually be more practical to displace the nozzle relatively to a mould assembly which is stationary at the time of discharge of the substance from the nozzle. Alternatively, a telescopic nozzle could be used for spreading the charge of substance within the moulding cavity. Whichever mode of relative movement between nozzle and moulding cavity is employed the nozzle needs to be completely withdrawn from the moulding cavity to permit of pressure-applying inward movement of a movable component of the mould assembly.

The volume of plasticised substance discharged over any given period and the rate of relative displacement between nozzle and mould assembly may be made variable, in a number of ways, in response to preset control means.

While the improved method of moulding as above defined is suited particularly to employement in the manufacture of articles from viscous materials it is suited also to use with more free flowing substances in mould constructions wherein local restrictions in cross-sectional area may result in momentary increases in mould pressure during a mould filling operation and where such increases may prove damaging to mould inserts or frangible assemblies onto which the substance is being moulded.

The present invention also provides novel apparatus for practicing the improved moulding method referred to. Such apparatus preferably provides for relative displacement between a discharge nozzle and a particular mould assembly with which, for the time being, the nozzle is associated. A plurality of mould assemblies may be mounted in somewhat conventional manner on a rotatory table adapted to present the mould assemblies in succession to a feeding station, so as to align with the longitudinally displaceable nozzle. Projection of the nozzle into an aligned mould assembly and withdrawal of the nozzle therefrom at a controlled rate of travel (uniform or variable), during which withdrawal movement discharge of a plasticised substance from the nozzle, also with a controlled volumetric discharge per unit time (again uniform or variable) is conveniently effected by bodily displacement of a suitable injection means relatively to the moulding assemblies, which latter, as above mentioned, may be successively alignable with the discharge nozzle (mounted on said displaceable injection means) by means of a conventional rotatable table as previously mentioned.

The mould assemblies employed also embody novel features of construction and operation devised with a view to rapid and efficient working of the apparatus. For instance, a moulding machine adapted for spread-charge moulding as above defined and employing a rotary mould table may, and preferably does, arrange for the spread charge of substance to be deposited in a moulding cavity on top of an inverted shoe upper assembly supported on a last (so as to form one wall of the moulding cavity) and to be subjected to an initial high moulding pressure through the aforesaid movable mould component, whilst still at the feeding station, provision being made to hold down the mould component as the mould assembly of which it forms part is carried round by an intermittent rotary or stepping movement of the mould table. The period of time occupied by the mould table in making one complete revolution, that is, to realign a particular mould assembly with the axially displaceable injection means and nozzle is sufficient to allow for vulcanisation of an ealstomeric substance or the curing of an elastoplastic substance and for the loading and unloading of the moulds.

In order that the invention may be more readily understood the improved method of spread-charge moulding hereinbefore defined and a novel form of machine for practising such method will now be more particularly described with reference to the acompanying drawings. These drawings of a diagrammatic form show schematically the essential basic components of the machine; they are intended primarily to illustrate only such features as are essential to an understanding of the invention.

In the drawings:

FIGS. 7 and 8 concern raw material mixing.

Figure 1:
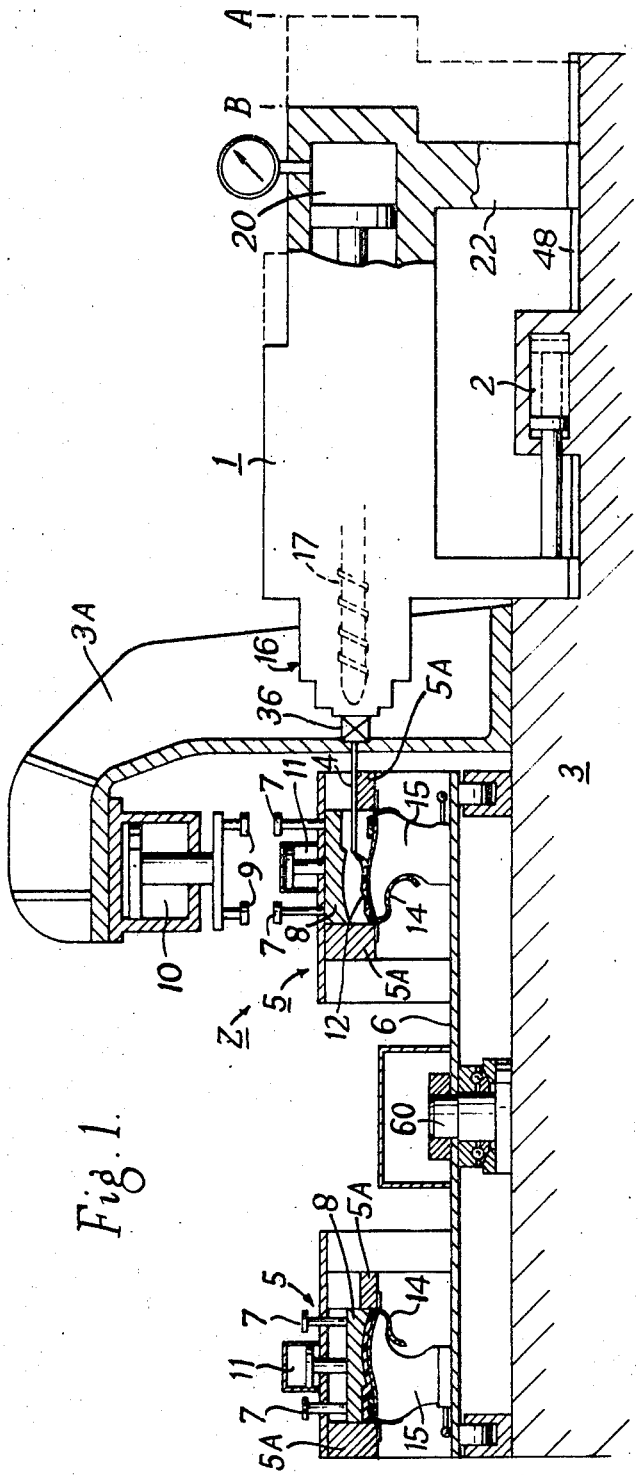
FIG. 1 is a view, partly in section, of one form of apparatus for practising the method of the invention.

As shown in FIG. 1 a suitable plasticising and feeding device for purposes of the invention comprises injection means in the form of a screw type extruder 1, mounted for reciprocatory movement by means of a pressure fluid motor 2 over a base frame 3. The extruder 1 carries an extension in the form of a nozzle 4 which is adapted to enter the moulding cavity of a mould assembly 5 when said displaceable extruder 1 with nozzle 4 are in the forward position shown in FIG. 1. A mould supporting table 6 is rotatably mounted for successive presentation of a plurality of such mould assemblies 5 to the nozzle 4, and these mould assemblies may be of any convenient quantity and form, sequentially or selectively alignable with said nozzle 4 at the feeding station Z shown in FIG. 1. Each mould assembly 5 comprises a vertically movable mould component 8, of ram form, having extending pillars 7 which, at the feeding station Z, are juxtaposed with corresponding plungers 9 downwardly extending from a pressure fluid motor 10 mounted on an overhang standard 3A carried by base frame 3. Each mould assembly 5 also includes a pressure fluid motor 11, operably connected to said mould component 8. One wall of the moulding cavity is constituted by a lasted shoe upper 14 supported on a removable last 15, the remaining walls of said cavity being formed by said movable ram 8 and of side moulds 5A. The mould table 6 is rotatable about a vertical axle 60 by any suitable drive means (not shown).

Figure 2:
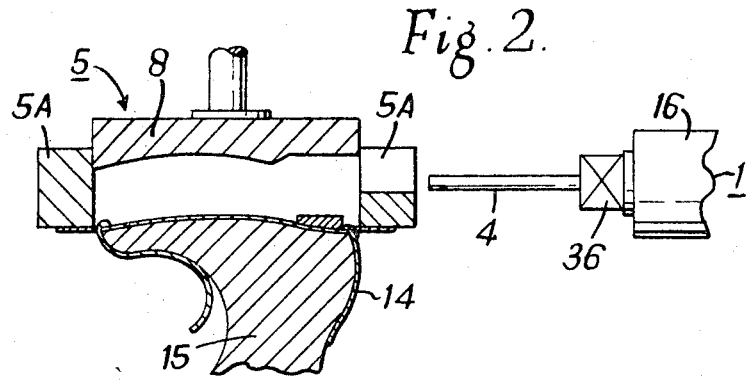
FIGS. 2, 3, 4 and 5 illustrate sequentially the moulding operation.

In operation the extruder 1 is adapted to be displaced (by operation of the fluid motor 2) rearwardly to the position A as shown in FIG. 1, whereupon one of the mould assemblies 5 is adapted by movement of table 6 to be presented in alignment with the nozzle 4 as shown in FIG. 2.

Figure 3:
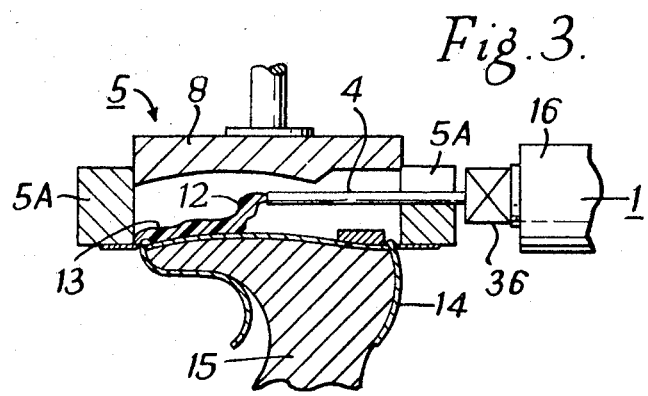

The ram 8 of the aligned mould assembly 5 is raised by its fluid motor 11 to permit of entry of the nozzle 4 when the extruder is returned to position B, in readiness for the depositing of a charge of plasticised substance thereafter delivered under pressure from the extruder 1 through nozzle 4 into the moulding cavity. Subsequent to the discharge of a required volume of the plasticised substance 12 to the outermost portion 13 of the moulding cavity (FIG. 3) the extruder 1 is again returned toward position A, while the nozzle 4 continues to discharge the substance into the moulding cavity to distribute it during retraction.

The means employed to control the reciprocatory movements of the extruder 1 and the flow of substance through the nozzle 4 are so arranged that the rate of retraction may be varied throughout the movement and on the rate of delivery of the substance may be varied throughout all or part of the mould filling sequence in order to effect any desired distribution of volume of the substance throughout the moulding cavity.

Figure 4:
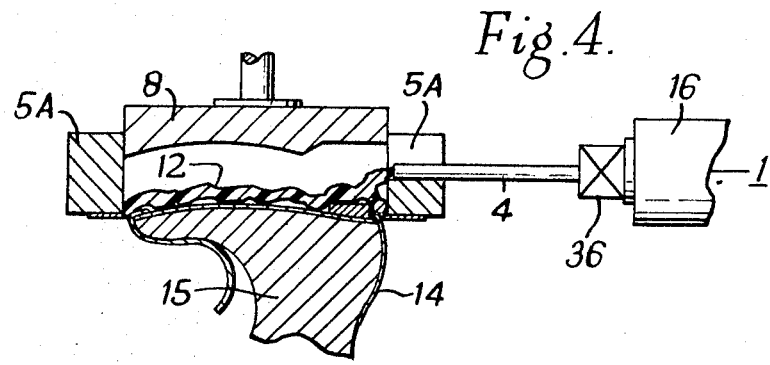
Figure 5:
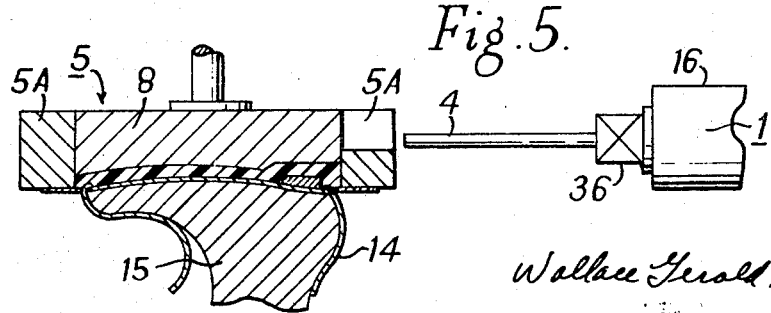

Continued retraction of the nozzle 4 by movement of extruder 1 distributes the plasticised substance, uniformly or variably as required, within the moulding cavity and on complete retraction of the nozzle 4 from the mould assembly 5, as shown in FIG. 4, the delivery of the substance is terminated. The mould is then closed by the vertical descent of the ram 8, effected by fluid motor 10 (FIG. 1) through abutment of the plungers 9 with the pillars 7. The closing pressure applied by the motor 10 is sufficient to effect the moulding of the injected substance to final form as shown in FIG. 5.

The subsidiary fluid motor 11 is operated simultaneously with the motor 10; but whereas on completion of the moulding action the motor 10 is retracted to disengage the plungers 9 from the pillars 7, the motor 11 remains operative and maintains pressure on the moulded substance during any subsequent curing or cooling cycle. Where the substance being moulded is rubber or other elastomeric material the mould components are heated in conventional manner to provide a vulcanising temperature.

On completion of the filling and moulding steps at the feeding station Z the table 6 is rotated to align another mould assembly 5 with the nozzle 4, while the previously operated mould assembly remains closed until, on completion of the required curing or cooling period, the ram 8 is raised by motor 11, the mould assembly opened by conventional means (not shown) for removal of its contents and for reloading thereof with another lasted shoe upper for further presentation.

The invention has been described in relation to the moulding and simultaneous attachment of soles and heels to footwear but is not limited to employment in that field. It may, for example, be employed in combination with moulds for the production of relatively long articles of small or varying cross section not readily suited to conventional extruding or moulding techniques or in any other mould assembly where the ability to predetermine the distribution of the mass to be moulded is advantageous.

Figure 6:
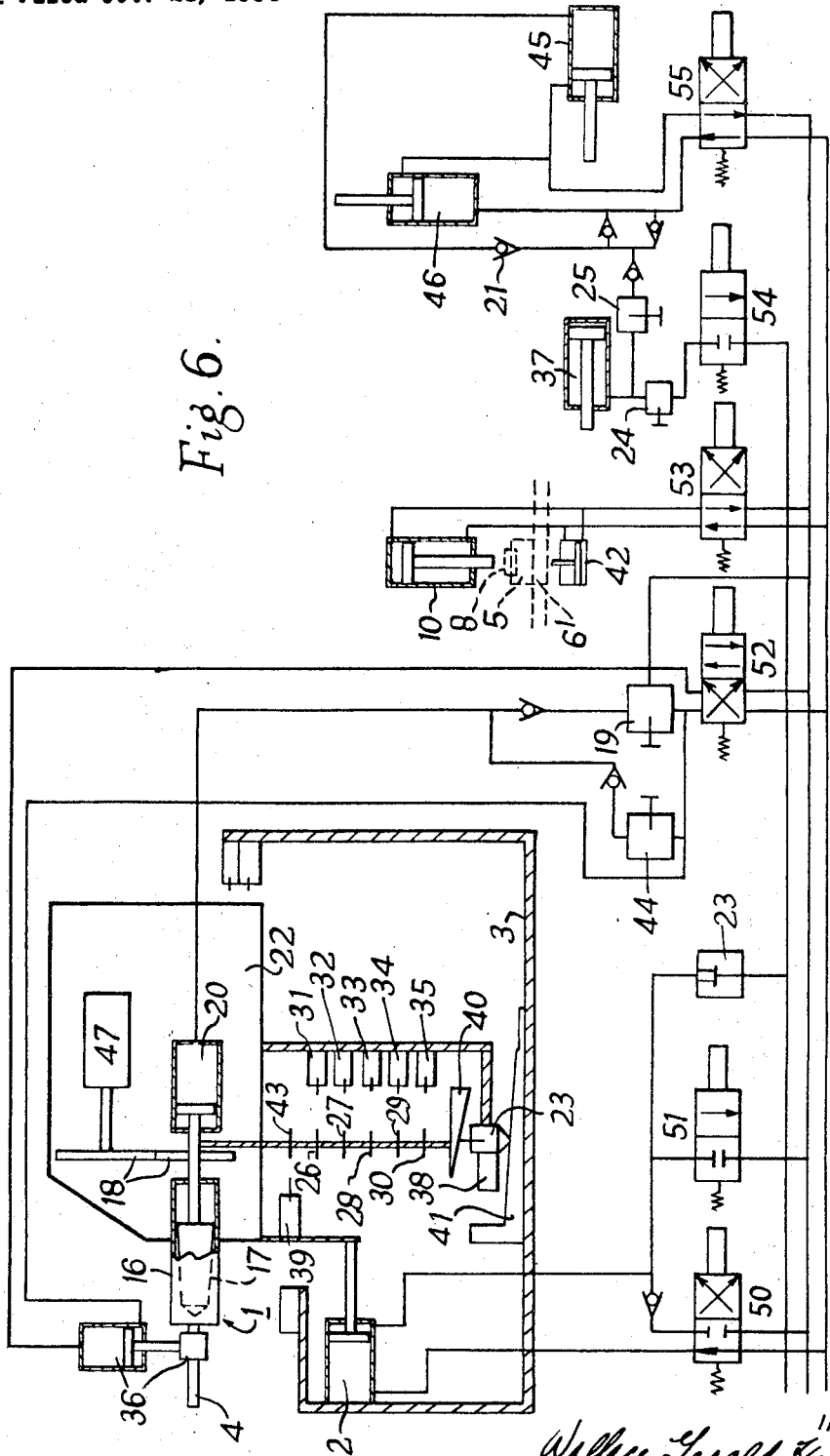
FIG. 6 is a simplified drawing of the main electrically-controlled fluid-operated components of the machine.

FIG. 6 of the drawings illustrates schematically certain operable parts of a moulding machine according to the invention, including some electrically-controlled fluid-operated components. The extruder components, fluid motors, switches, solenoid and check valves and the like referred to in the following description are mainly of conventional form and do not require detailed reference. The location of some components is not material and they may be situated wherever convenient whilst the relative positioning of other components will be readily understood from the function of the component in the machine cycle.

Some of the components referred to in the following description of a controlled machine cycle have been mentioned in connection with FIGS. 1 to 5. The main mechanical features of the machine are the mounting of the extruder 1 (with its associated drive means) capable of bodily displacement with a carriage 22, which is slidable on the base frame 3 and adapted to be moved to and fro by fluid motor 2. The nozzle 4 extends forwards from the extruder 1 and partakes of its movements so that it is thereby projectable into and retractable from the moulding cavities of mould assemblies 5 successively aligned with the nozzle 4 by rotation of table 6. The control circuitry (mainly fluid-operated components) shown in FIG. 6 provides for automatic functioning of the machine through its operation cycle, and for the purpose of describing the function of the machine it is assumed that certain components have the following attitude, viz, the carriage travel ram 2 and the screw ram 20 are extended, the ram 8 and a ram 42 which supports the table during application of pressure from fluid motor 10 and a table-movement damping ram 37 are all withdrawn, and a ram 36 adapted to cut off the supply to nozzle 4 of substance plasticised in extruder 1, a table indexing ram 45 and a table catch ram 46 are all extended. The motor 47 driving extruder screw 17 and a conventional raw materials feeding device (not shown) are both running, and solenoid valves 50, 51, 52, 53, 54 and 55 are all deenergized.

As raw material is fed into the extruder barrel 16 for plasticising, the plasticised substance is moved forward in said barrel 16 by the screw 17, which is revolving at a speed determined by the ratio of a gear train 18 interposed between said screw 17 and the screw motor 47.

As material is fed into the barrel extruder 16 the screw 17 is thereby forced backwards and this expels oil from ram 20 through a pressure check valve 44, which may be preset to suit the material being fed to the barrel.

As the screw 17 travels backwards it carries with it a set of five switch-operating fingers 26, 27, 28, 29 and 30, any one of which may be set independently at varying distances from five associated switches 31, 32, 33, 34 and 35 respectively mounted on the carriage 22 so as to move therewith.

Each pair of moulds 5 on the table 6 of the machine is allotted a particular voltage reference that is picked off by a selector (not shown) at the centre of the table 6. The voltage from any particular mould 5 is fed into a suitable voltage selective relay network that identifies which one of five different voltages is concerned and operates to bring into circuit the appropriate one of the switches 31, 32, 33, 34 or 35. For the purpose of explanation let it be switch 31 with which is associated operating finger 26.

When the operating finger 26 moving with screw 17 reaches switch 31, it operates said switch and thus causes the screw motor 47 to stop turning; it also causes the feeding device to stop feeding material to the screw 17. By this means the barrel 16 is charged with the correct amount of material required by a given mould.

At any time after the screw 17 has commenced charging, the table 6 may be rotated by energising solenoid valves 54 and 55 to allow oil to pass respectively to the table catch ram 46 which rises to coact with a table stop, and to the table indexing ram 45 which rotates the table 6. The speed with which the table rotates is determined by a check valve 21.

After the table 6 has rotated through an arc of approximately 30 degrees a cam piece attached to the underside of the table 6 is caught by the operated catch, which is solidly linked to the table damping ram 37, which then slows down the table 6 and halts it after an arc of approximately 36 degrees has been completed from the original starting point. The severity with which the table 6 is damped is determined by the setting of a speed control valve 24.

After a short delay, achieved by a pneumatic timing relay the solenoid valves 54 and 55 are deenergised and oil is passed to the opposite side of the table indexing ram 45, the table catch ram 46 and the table damping ram 37, so that all these rams take up their prerotation attitudes.

The speed with which the table damping ram 37 resets is controlled by the setting of a speed control valve 25.

At the same time as solenoid valves 54 and 55 are deenergised solenoid valve 50 is energised and this allows oil to pass to the carriage travel ram 2, causing the carriage 22 to move forward along two slides 48 towards the mould 5 now situated at the feeding station Z. Mounted upon the carriage 22 also are a follower valve 23, switches 38, 39 and a cam 40.

Situated under the table and attached to the base frame 3 of the machine are five air valves operable by ten cams; one of these cams is attached to the underside of table 6 adjacent each moulding station of the table. As the table 6 rotates the appropriate cam presses the appropriate air valve and allows air to pass to two small rams situated under either end of one of five cams 41. The contour of each cam 41 is arranged to give a certain material distribution pattern for the related moulds 5 and to provide also a striker point for switch 38.

When the carriage 22 has moved sufficiently far forward to cause switch 38 to strike the cam 41, solenoid valve 50 is deenergised, and at the same time solenoid valve 52 is energised to allow oil to pass to the screw ram 20 (via pressure controlled valve 19) and to the nozzle cutoff ram 36. This causes the nozzle 4 to open to allow the plasticised substance to pass into the mould 5, while at the same time material is forced out of the extruder barrel 16 by the forward movement of the screw 17.

As the screw 17 thus travels forward within the barrel 16 it carries with it cam 40. This cam 40 presses onto the top of follower valve 23, thus pinching it between cams 40 and 41, and causing it to open; cam 41 is attached to the base frame 3. The opening of follower valve 23 allows oil to pass out of the carriage travel ram 2 and so the carriage 22 moves backward until the follower valve 23 shuts once more, whereupon the continued forward movement of the screw 17 causes cam 40 to reopen the follower valve 23. These openings and closings of the follower valve 23 are so rapid as to provide in effect a continuously varying orifice, thus providing smooth control of the speed of, and distance travelled by, the carriage 22, as dictated by the contour of cam 41.

As the screw 17 moves forward in the barrel 16, it carries with it switch operating finger 43 and when the screw has travelled fully forward in the barrel this finger 43 strikes switch 39. This switch 39 causes solenoid valve 51 to energise and so allow oil to pass unrestricted from the carriage travel ram 2, thus accelerating the last part of the backward travel of said carriage 22.

The switch 39 also causes solenoid valve 52 to deenergise, which causes the screw motor 47 to start and the nozzle cutoff ram 36 to close the nozzle 4 against the passage of further material; the material feed device then starts and solenoid valve 53 is energised.

The energisation of solenoid valve 53 allows oil to pass to the sole high pressure ram 8 and to the table support ram 42, thus clamping (in the vertical plane) the mould 5 just filled. After a period of time dictated by a pneumatic timing relay the solenoid valve 53 deenergises to cause the release of the clamping effect of rams 8 and 42. The above described cycle now repeats.

For the manual operation of the machine the sequence is much the same as above described, but each part of the sequence has to be initiated manually by means of push button switches. The machine has various electrical and hydraulic interlocks to ensure the correct sequence and to prevent damage to any part of the machinery due to malfunction. The machine also incorporates various override controls so that any given moulds may be automatically ignored, and various indicator devices may be fitted to show the sequential condition of the machine at various times during an operating cycle.

Each of the moulds 5 of the ten-mould table 6 has pneumatically-operated closing devices for the side mould components, the sole mould or ram 8 being reciprocatable by fluid motor 10, said sole mould or ram 8 being mounted on a heatable platen containing electric heaters and thermostats, and it is to this platen that the pillars 7 are secured.

After the introduction of the plasticised substance and its distribution within the moulding cavity by nozzle 4, the ram 8 has the initial high pressure applied thereto by motor 10 to effect moulding and this operation may also include a "bump" action in which the motor is pneumatically retracted after a short time, say 5 seconds, to assist in the removal of trapped air; this bumping action would be controlled by an additional valve device carried by one of the ram plungers 9.

The application of moulding pressure by motor 10 is of relatively short duration (say 30 seconds) and thereafter the motor is retracted and a "hold-on" pressure maintained by the pneumatically operated motor 11; this "hold-on" pressure is of a lower value but is maintained throughout the machine cycle until the moulds are opened.

The general principle of distribution of plasticised substance (the so-called "spread-charge" action) has already been described, but in this connection it should be stated that whereas the volume of the charge injected and distributed is important, satisfactory moulding can be obtained only if the charge is distributed differentially throughout the moulding cavity. For example, it is desirable to provide a relatively small quantity in the toe end of the cavity, a larger quantity in the main sole area, rather less in the waist and obviously a large quantity in the heel end of the cavity. Since the extruder 1 is of the screw-ram type the rate of ejection is controllable hydraulically by means of the cylinder of motor 20. Differential distribution is obtained by controlling the rate of retraction of the nozzle 4, that is, the passage of the nozzle is either accelerated or decelerated during its return stroke from the toe end to the heel end of the moulding cavity.

It will be understood that the fluid flow control valve previously referred to as follower valve 23 is arranged in parallel with the extruder retraction mechanism and is operated by cam 40 abovementioned during bodily reciprocal movement of the extruder 1. In general, as the extruder 1 retracts from the mould at the feeding station Z a cam follower biases the follower-valve 23 to meet the flow of hydraulic fluid from the exhaust side of the extruder motor 2.

Since the mould table 6 accommodates ten moulds 5, these allow of the employment of five different sizes of moulds so that five distinctly different charge volumes and rates of distribution may be provided for by the same mould table 6. It is intended that five cams 41 be employed and selectively engaged with the follower-valve 23 by preselection according to mould table indexing. Thus in respect of each pair of moulds 5 (for right foot and corresponding left foot footwear), one of the solenoid valves associated with the switch devices adjacent each mould pair would serve to raise an appropriate one of the bank of five cams 41 from a rest position into an operative position. Preferably the follower-valve 23 is mounted for sliding action against the resistance of return springs.

The present invention is also concerned with the problem of the suitable preparation of plasticisable substances intended for injection into moulds in a machine for practising the improved method of moulding as previously described herein.

A difficulty experienced in connection with the extrusion of rubber and vulcanisable elastomers is that of so-called "setup" or partial vulcanisation of the rubber or like mix in consequence of the heat evolved in the mixing of the ingredients, for instance, in the process premastication of the mix before its entry into an extrusion cylinder. The rate of flow of the mix through the cylinder itself may be such as not to raise its temperature materially. "Setup" by reason of frictional and chemical heat during mixing has some relation, of course, to the thoroughness of the mixing operation, because the more intimate the physical combining of the ingredients with a view to obtaining a homogeneous mix, the greater usually the temperature to which the mix is raised in the process and hence the greater the risk of "setup."

The present invention accordingly provides also for effecting delay in "setup" of a mix so that even after its passage through an extrusion barrel its temperature is sufficiently low to ensure that vulcanisation has not commenced or at least has not proceeded to a stage which interferes with free flow of the injected material to fully fill a moulding cavity. This "setup" in a vulcanisable mix may be delayed by employing a two-part mix, one mixture part containing inter alia the sulphur necessary for vulcanisation and the other mixture part containing inter alia an accelerating agent. There are a variety of ways in which the physical combining of these two mixture parts can be delayed until as near as possible to the moment of injection into a mould cavity. It will be appreciated also that the correct apportioning of the ingredients of the two mixture parts is as important as the manner of mixing said parts to delay "setup" and the present invention accordingly provides for varying the relative supply of the two parts to be mixed together.

One method is to prepare what may be called the "sulphur" part mixture and the "accelerator" part mixture in the form of extruded webs or strips which are provided in reel form and fed therefrom variably by separate feed rollers, so that the amount of one strip delivered per unit time may differ from the amount delivered of the other strip during the same period. The two strips are chemically inert until mixed together and this mixing is effected by delivering the two strips together—through a single inlet orifice if desired—into a mixing appliance, such as a single screw extruder. Alternatively, the two strips may be fed simultaneously into two parallel screws and thus do not merge together for final mixing until just prior to injection into a mould.

Another method is to provide two plunger-type pre-extruders, one for the sulphur part mixture and the other for the accelerator part mixture and to force the two mixture parts together through a common outlet orifice into a single screw extruder for final mixing and plasticising; alternatively rods of material may separately issue from the two plunger-type extruders and be collected in the bite of a pair of rollers which deliver the "mix" rods as a single bar of material into a screw extruder or other final mixer.

Yet another method is to utilise mix ingredients in granular form, automatically and separately weighing the "sulphur" and "accelerator" mixture parts, delivering the weighed granular material into a common container and feeding mixed material therefrom by a vibratory feeder into an extruder.

Each of the methods above referred to involves the use of two-part mixing, that is, separately produced "sulphur" and "accelerator" mixture parts, the methods differing in the manner of subsequently combining these two parts.

A further procedure is possible, namely, the employment of two extruders of screw and/or plunger types, each adapted to practising the spread-charge method of moulding previously described. In one such extruder the whole of the required ingredients are partially mixed and plasticised, that is, to an extent that the partially plasticised material—which goes into the second extruder—issues at a safe "below setup" temperature. In the second extruder the material, without raising its temperature to result in any material degree of setup, is finally and completely mixed and plasticised before injection into a mould.

In general, the mixing of raw ingredients may be by normal intermittent screw and plunger extruders, continuous mixing extruders, Banbury type mixers, and modified screw extruders having ram-ended charge-expelling screws. For accurate temperatuer control it may be necessary to introduce various ingredients at different feed points along the cylinder of an extruder to produce compounds of different compositions.

It will be evident that the shortest possible connection should be provided between an extruder and an associated injection moulding machine, and this connection preferably incorporates a feed cutoff, such as described with reference to FIG. 6; alternatively an injection piston may serve to blank off a feed port to a mold. With a screw type final extruder the intermittency of rotation of the screw may match a stepping rotation of the mould table, or where this is not convenient an auxiliary storage cylinder with hydraulically operated expulsion means may be interposed between an intermittently operating injection moulding machine and a continuously running extruder.

The main purpose underlying all the various ways and means above referred to is to delay as long as possible subjecting the vulcanisable plasticised materials to conditions likely to result in attainment of a temperature which will produce "setup." Another approach to the problem therefore is to prepare the ingredients as a single mix or as a two-part mix and keep its temperature reasonably low or as low as passible—not as near "set-up" temperature as possible—and then to create the required near vulcanising temperature by heat of friction due to forcing the material under high pressure through a small die or nozzle orifice into a heated mould, which raises the injected material to vulcanising temperature.

FIG. 7 illustrates the feeding of two strips of material 100, 101 through separate variable speed feed rolls 102, 103 respectively to a single feed inlet 104 of a screw type extruder cylinder, and FIG. 8 illustrates the the use of two plunger-type extruders 105, 106 feeding two parts of a mix as extruded rods 107, 108 respectively into a common extruder cylinder feed inlet 109; the two extruders 105, 106 are selectively controlled by a mixer device 110.

What is claimed is:

1. The method of moulding combined shoe soles and heels nonuniform cross-sectional area in a closable mould cavity that is defined in part by the bottom of a prepared lasted shoe upper which comprises the steps of moving at least one component of the mould to open up the mould cavity a sufficient amount as to allow the introduction of a discharge nozzle, moving said nozzle into the mould cavity so that the mouth of said nozzle approaches the end of the cavity remote from the point of entry of said nozzle, discharging a moulding material at a constant rate from the mouth of said nozzle while the mouth is positioned within the cavity, moving the nozzle relative to the mould in a direction to withdraw it from the cavity during said discharging, adjusting the rate of withdrawal movement to control the amount of material deposited so that the volume of material deposited is proportional to the cross-sectional area of the closed mould cavity at the point of deposit, and moving the said one component of the mould to close the mould cavity after withdrawal of the nozzle therefrom.

2. The method as claimed in claim 1, which comprises the step of further displacing the said one component of the mould so as to apply a moulding pressure to the moulding material deposited in the mould cavity.

3. The method as claimed in claim 1, wherein the moulding material is selected from the group consisting of an elastomeric and an elastoplastic substance.

4. The method as claimed in claim 1 wherein the moulding material is a part plasticized rubber mix.

References Cited

UNITED STATES PATENTS

| 1,858,956 | 5/1932 | Hepperle. | |
| 2,128,239 | 8/1938 | Ferngren | 264—98 |
| 2,289,168 | 7/1942 | Barber | 94—46 |
| 2,589,257 | 3/1952 | Horning | 94—46 |
| 2,964,795 | 12/1960 | Schaich. | |
| 3,019,480 | 2/1962 | Soubier. | |
| 3,306,960 | 2/1967 | Weissman et al. | |
| 3,343,210 | 9/1967 | Guignard. | |

ROBERT F. WHITE, Primary Examiner

T. J. CARVIS, Assistant Examiner

U.S. Cl. X.R.
18—30, 36; 264—331